Dec. 21, 1948.  P. E. MONATH  2,456,981
SELF-STIRRING COOKING UTENSIL
Filed April 18, 1945  4 Sheets-Sheet 1

INVENTOR.
PAUL E. MONATH
BY
Robert E. Burns
ATTORNEY

Dec. 21, 1948.　　　P. E. MONATH　　　2,456,981
SELF-STIRRING COOKING UTENSIL
Filed April 18, 1945　　　　　　　　　　　　4 Sheets-Sheet 2

INVENTOR.
PAUL E. MONATH
BY
Robert E. Burns
ATTORNEY

Dec. 21, 1948. P. E. MONATH 2,456,981
SELF-STIRRING COOKING UTENSIL
Filed April 18, 1945 4 Sheets-Sheet 3

INVENTOR.
PAUL E. MONATH
BY
Robert E. Burns
ATTORNEY

Dec. 21, 1948. P. E. MONATH 2,456,981
SELF-STIRRING COOKING UTENSIL
Filed April 18, 1945 4 Sheets-Sheet 4
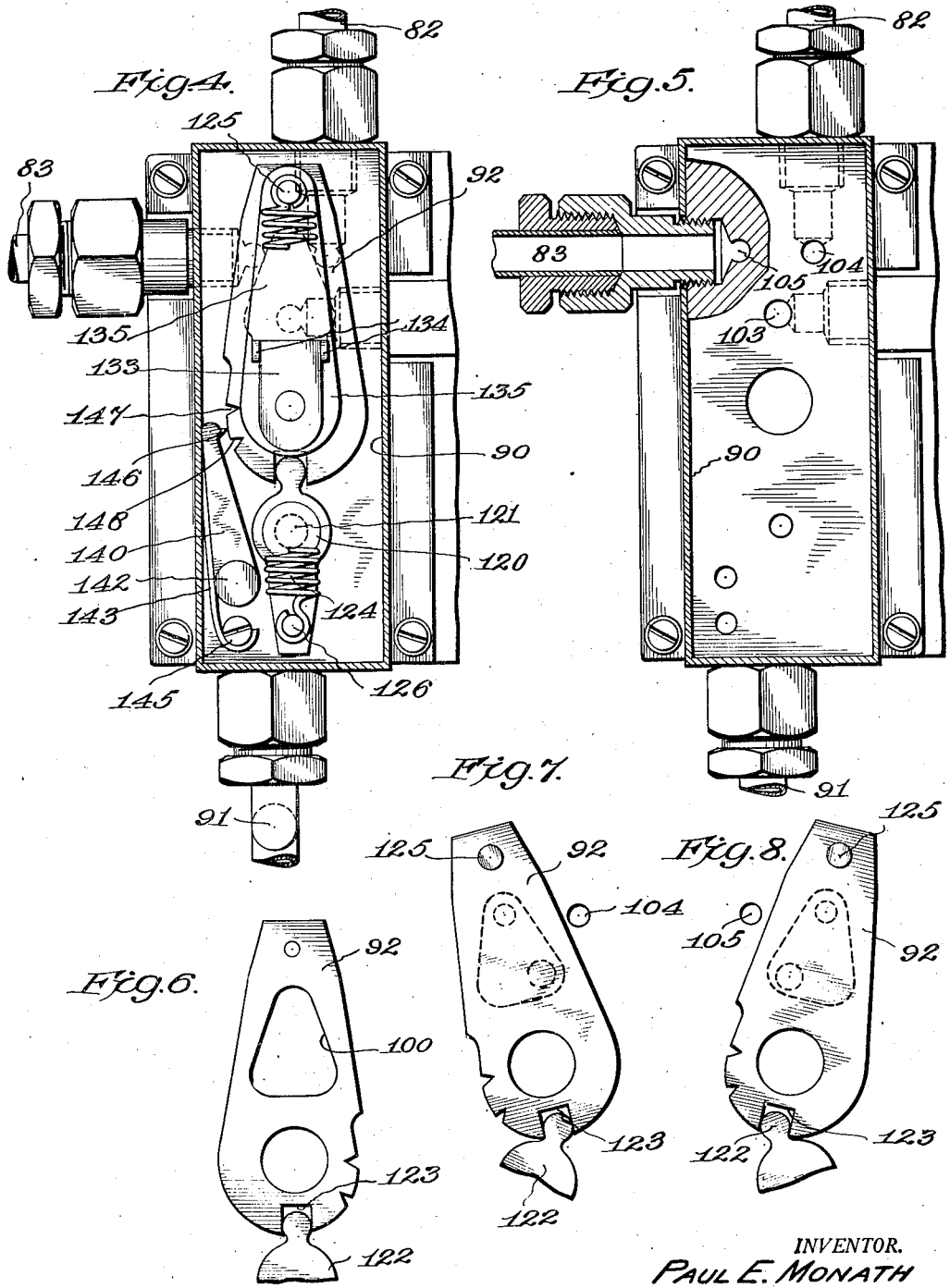
INVENTOR.
PAUL E. MONATH
BY
Robert E. Burns
ATTORNEY Patented Dec. 21, 1948

2,456,981

UNITED STATES PATENT OFFICE 2,456,981

SELF-STIRRING COOKING UTENSIL

Paul E. Monath, Hewlett, N. Y.

Application April 18, 1945, Serial No. 589,013

13 Claims. (Cl. 257—74)

This invention relates to an apparatus for stirring material as it is being treated by the application of heat. More particularly, it relates to an apparatus for simultaneously cooking and stirring fluid or semi-fluid materials as they are being cooked.

In preparing materials by the application of heat, and particularly in cooking many foods, it is desirable if not necessary to stir them frequently. In many instances the heating or cooking is accomplished better if the material is stirred continuously. This is particularly true in the cooking of foods, which represents an important, although not the only, use of the present invention.

Apparatus by which this end may be attained has been disclosed and claimed in my copending application, Serial No. 532,722, filed April 26, 1944, now Patent No. 2,396,924, issued March 19, 1946, and entitled self-stirring cooking utensil. In that application there is disclosed a self-stirring heating and cooking utensil in which the stirring apparatus is mounted chiefly on the exterior of the vessel itself. This construction has been found to give good results, but is subject to certain improvements by which a better apparatus for the intended purpose can be produced. In particular, it has been found that a more efficient and marketable product would result if all the operating mechanism was placed inside of the vessel walls.

Such a construction presented many problems and their solution resulted in certain changes in the apparatus by which its function and its operation have been improved. This improved apparatus is steam driven as is its predecessor and changes have been made in the steam system to simplify its construction and improve its operation. A neater and more easily cleaned apparatus has been attained by placing the operating parts of the stirrer inside the vessel. These and other improvements have been attained without sacrificing any of the advantages inherent in the apparatus described in the application referred to above.

An object of the present invention is to provide a self-stirring apparatus of the type indicated, in which the operating mechanism is contained within the confines of the vessel. Another object is to provide an apparatus in which a smoothly shaped vessel contains a cooking chamber and a steam chamber with all of the stirrer operating mechanism inside the steam chamber. Still another object is to provide apparatus in which the operating mechanism is not cooled by air currents outside of the vessel but is continually maintained at the temperature of the steam so that condensation is avoided. A still further object of the invention is to provide driving mechanism for the stirrer that is simple of operation and positive in action. A further object of the invention is to provide a steam driven piston operated stirring mechanism in which the valves are positively retained in position and also snapped substantially instantaneously from one valve position to the other. It is also an object of the invention to provide a stirring mechanism that may be easily altered either to oscillate the stirring paddles or to rotate them continually in one direction.

In general, the apparatus of the present invention is embodied in a cylindrical container divided into an upper or cooking chamber and a lower or steam chamber. The two chambers are separated by a wall that should be a good conductor of heat. A stirring paddle in the top chamber is driven by mechanism located in the bottom chamber and connected to the stirrer by a central shaft passing through the wall separating the two chambers.

In a preferred form of my invention shown and described herein, the driving mechanism employs two opposed steam driven pistons connected by a rack so that one piston drives the rack in one direction and the other returns it. The rack drives gearing connected to the central shaft to rotate the paddle. Reciprocation of the pistons is controlled by valve mechanism associated with the cylinders and within the steam chamber. Steam generated by water evaporated in the steam chamber passes through the valve mechanism to the pistons. Exhaust steam is discharged through the same valve mechanism.

The steam chamber is operated so that steam pressure corresponds to the temperature desired in the cooking vessel. In other words, if the temperature of the cooking vessel should be 240° F., then the mechanism is set so the pressure of the steam will roughly correspond to steam at 240° F. The heat transfer from the steam through the wall separating the two chambers raises the food to the desired temperature. Although an increase in steam pressure will drive the paddles faster, this is to be desired, as foods cooked at elevated temperatures should generally be stirred more vigorously than foods cooked at lower temperatures.

Reference should be had to the following text and to the accompanying drawings for a more complete description of the apparatus and for the disclosure of additional objects of the invention. The novel features of the invention are summarized in the claims.

In the drawings,

Fig. 4 is an enlarged horizontal section showing the valve mechanism, and taken approximately on the same plane as Fig. 3.

Fig. 5 is a view similar to Fig. 4, but with movable parts of the valve mechanism removed.

Figs. 6, 7 and 8 are details of the valve element by which steam is admitted to the driving cylinders.

Figure 1:
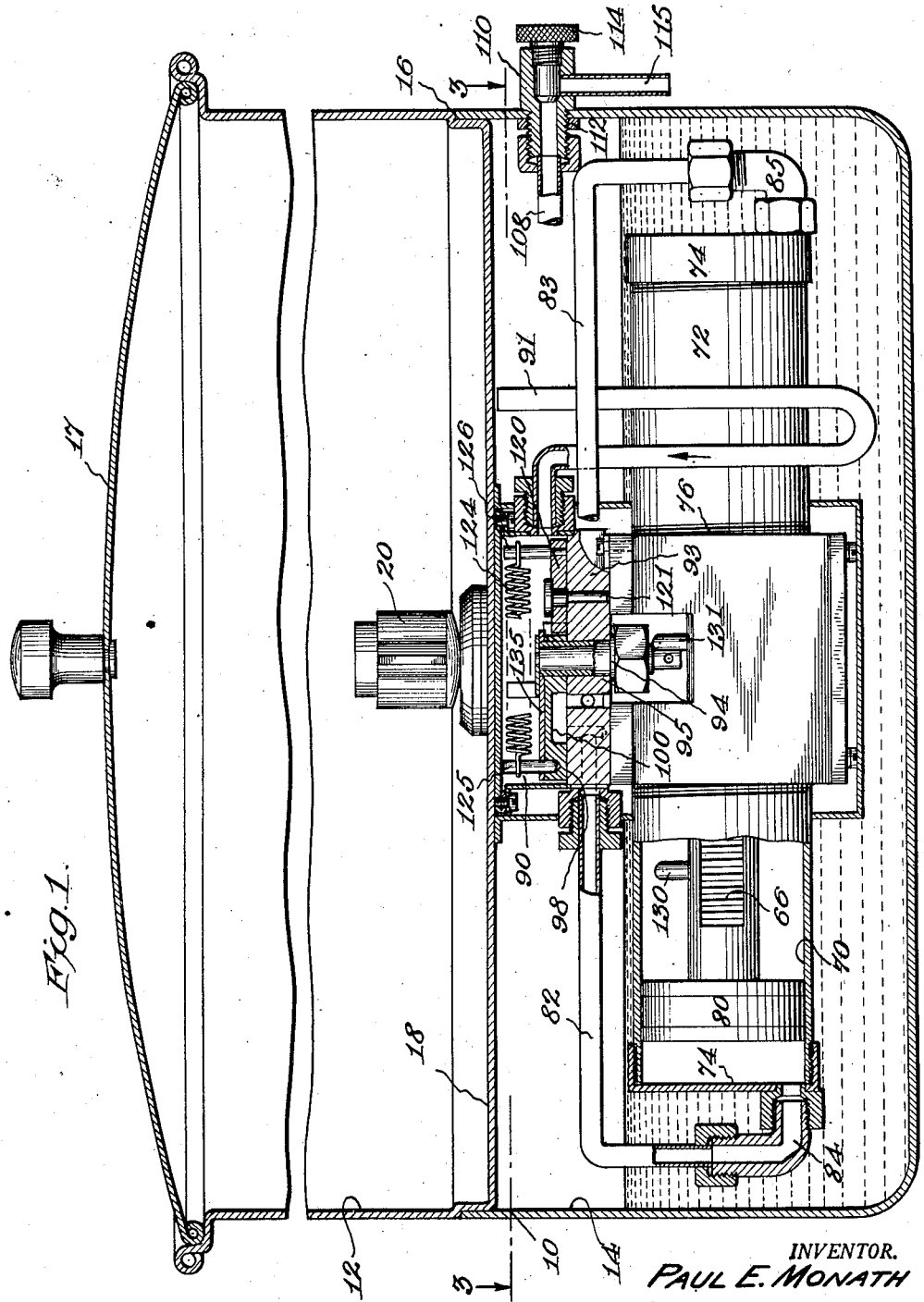
Fig. 1 is a vertical section through apparatus embodying my invention.

Referring now to Fig. 1, my invention is shown by way of example embodied in a cooking vessel 10 in which the material to be cooked is placed in a heating chamber 12 supported on a steam chamber 14. This vessel is shown as made in two parts fitted together at an annular joint 16 but it will be understood that if desired a single sidewall may encompass both chambers. A top 17 is provided to seal the upper cooking vessel. The cover 17 may, if desired, be made steam tight to provide for cooking the material under pressure.

The two chambers are positioned in heat transferring relation to each other and are separated only by the bottom 18 of the cooking chamber. This bottom being relatively thin and made of metal is a good conductor of heat and transfers heat for cooking from the bottom chamber to the top. In operation, heat from an external source as a stove is applied to the lower chamber to heat the water therein and convert it to steam. This steam is used to drive the stirring mechanism. The steam also circulates adjacent the horizontal bottom 18 and the heat of the steam is transferred therethrough to the material being cooked in the cooking chamber.

An object of the present invention has, as stated above, been to provide an improved automatic means by which the material in the cooking chamber may be stirred during the cooking process. This is accomplished by a paddle wheel or stirrer that may be either oscillated or continually rotated upon its axis as desired. In the embodiment shown, it is preferred that the paddle be continuously rotated, although as hereinafter explained, the mechanism may be modified to cause the paddle to oscillate back and forth about its axis.

Figure 2:
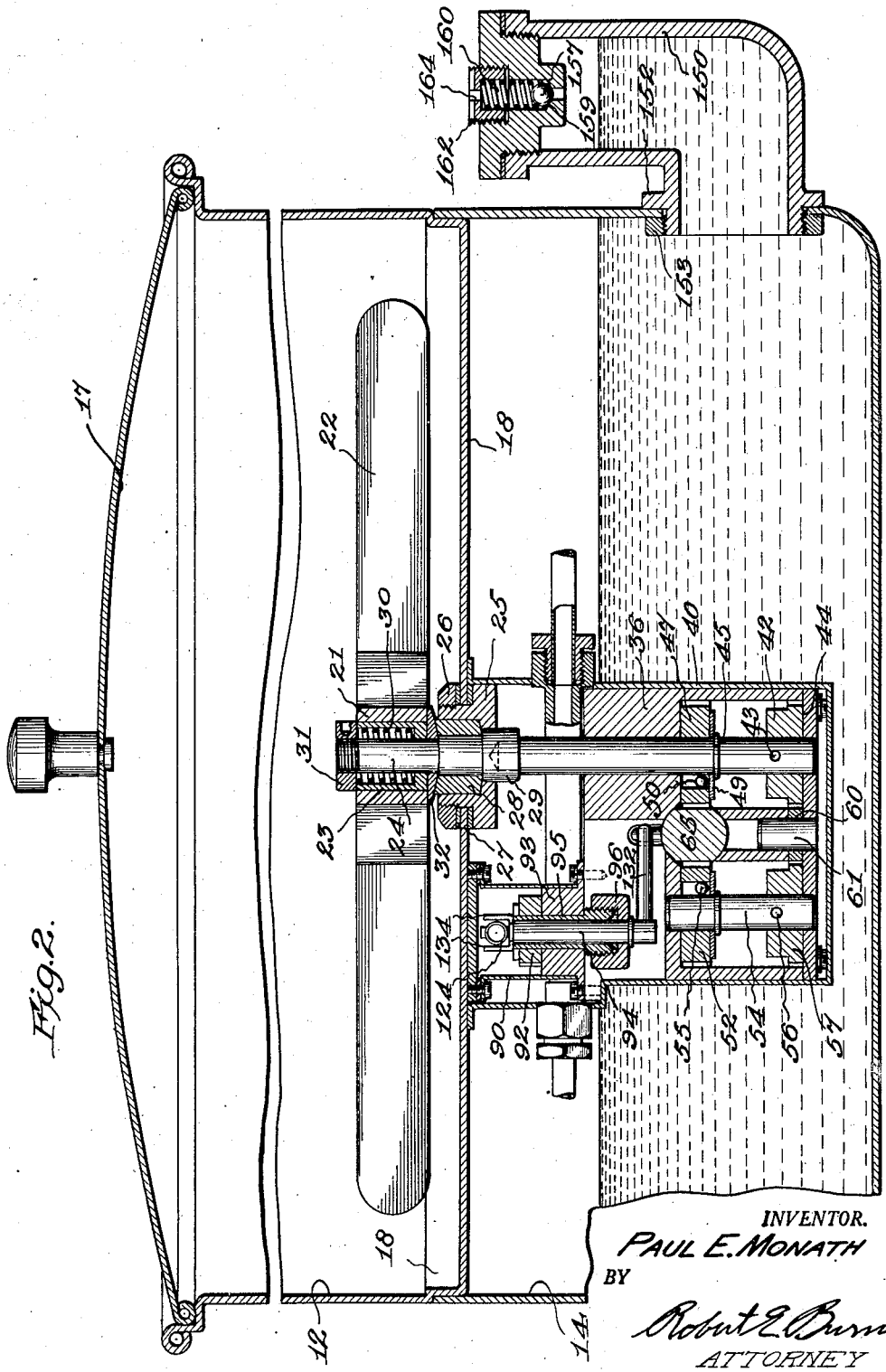
Fig. 2 is a vertical section normal to Fig. 1.

The paddle, referred to generically by the reference number 20, is shown in Figs. 1 and 2 as comprising a central hub 21 and a pair of opposed paddle blades 22. The number of blades may, of course, be varied as desired. The hub 21 has a central opening and fits over and rotates with a bushing 23 carried by a central shaft 24. The central opening of the hub 21 and the interengaging surface of the bushing 23 are preferably circular or otherwise formed to provide a driving connection between the bushing and the paddle while permitting the paddle to be lifted out to facilitate cleaning. A suitable key or other driving connection is also provided to cause the bushing 23 to rotate with the shaft while permitting limited axial movement of the bushing on the shaft.

The shaft 21 extends down through the wall 18 separating the cooking chamber 12 from the steam chamber 14, and is provided with a fluid tight seal which prevents passage of fluid from one of said chambers to the other while permitting free rotation of the shaft. In the center of the bottom plate a bearing cup 25 passes through an opening in the plate and is secured thereto by a nut 26. Packing 27 effects a tight seal to prevent leakage between the top and bottom chamber. Seated within the member 25 and fitting tightly therein to prevent displacement, is a bearing 28 which is preferably of the oilless or self-lubricating type. At its lower end the shaft 24 is provided with an enlarged portion 29 which forms a flange or shoulder engaging the lower face of the bearing 28. A spring 30 acting between an inwardly projecting flange or shoulder on the bushing 23 and a nut 31 threaded onto the upper end of the shaft 24 exerts a downward force on the bushing, and an upward force on the shaft, so that the enlarged portion 29 of the shaft is held in sealing engagement with the bearing 29. A washer 32 is preferably provided between the bushing 23 and the bearing 28, the lower surface of the washer being shown convex while the upper surface of the bearing is correspondingly concave. It will be seen that by reason of the relative axial movement permitted between the bushing 23 and shaft 24 and the force exerted by the spring 30, the washer will be held in sealing engagement with the upper face of the bearing 28 and prevent entry of food or other substance into the bearing.

The shaft 24 is driven by an axially aligned drive shaft 35, suitable driving connections being provided between the two shafts. The driving shaft 35 is journalled in a block 36 which in turn is mounted in a fluid tight sheet metal case 40 enclosing substantially all of the stirrer driving mechanism. Two gears are carried by the shaft 35, one is indicated at 42 keyed as at 43 to the shaft and providing at the surfaces 44 a thrust bearing to support the shaft 35. An annular shoulder 45 is formed on the shaft to support a second gear 47 interposed between it and a washer 49. The gear 47 is keyed to the shaft 35 by an overrunning clutch device providing for rotation of the shaft by the gear in one direction only. For example, the pinion 47 may be provided with a radially tapered opening containing a spring loaded ball 50. The ball effects a drive engagement with the taper in only one direction of rotation. In the reverse direction of rotation the ball lies idly in the enlarged portion of the opening and no driving of the shaft is effected.

As indicated above, provision is made for continuously rotating the paddle. To this end a second drive pinion 52 is provided on countershaft 54 which is parallel to drive shaft 35. The pinion 52 is keyed to its shaft 54 by means of an overrunning clutch comprising a tapered recess and spring loaded ball 55 corresponding to the ball 50 of pinion 47. The gears 47 and 52 are so mounted on their shafts that they drive them in opposite directions. Also keyed to the shaft 54 by a pin 56 is a gear 57. The lower face of gear 57 acts as a thrust face for shaft 54 and its gears. The gears 42 and 57 are connected through an idler gear 60 carried on a pin 61 mounted as shown in Fig. 2.

The driving of the gears 47 and 52 is effected by a reciprocating rack 65. This rack has teeth 66 on each side of it, the teeth on one side engaging gear 47 and the teeth on the other side engaging gear 52.

Summarizing the operating of the mechanism thus far, it will be seen that as the rack 65 is moved in one direction, it will rotate the ear 47 to drive the shaft 35 and in turn impart rotation to the paddle. Although the gear 52 will also be rotated the shaft 54 will not be driven by it due to the position of the ball 55. As the rack moves in the opposite direction, the ball 50 slips out of driving engagement and the gear 47 no longer drives the shaft 35. Instead the gear 52 now drives the stub shaft 54 and the gear 57. This later gear acting through the idler 60 rotates the gear 42 which drives the shaft 35 to continue its rotation in the same direction as that established previously by gear 47. The expansion type, steam pressure operated motor and connecting gearing described above provides a low speed, high torque drive for the shaft 35 rotating the paddle 22, as required, for example, in stirring viscous, semi-fluid material such as porridge, cream sauce or jam. A high torque is also required for example in the event the device is used to was out clothes or like materials, the clothes being placed in a soap solution in the vessel and heat applied, the paddles agitating the clothes in the soap solution and the heat softening any grease thereon.

If it is desired to impart oscillating motion to the paddle, the balls 50 and 55 may be removed from the gears 47 and 52 and the gear 47 fixedly keyed to the shaft 35. Then the shaft 35 will be oscillated as the rack itself is oscillated.

The rack 65 is driven by a pair of steam cylinders, shown in Fig. 1 and indicated at 70 and 72. The cylinders are shown formed of tubular stock and each is provided with an end cap 74 threadedly secured thereto. The cylinders in turn are threadedly secured at 76 into the block 36 supporting the valve assembly. In each cylinder is a piston 80 and the two pistons are connected by the aforementioned rack 65. The rack is shifted in one direction by admission of steam to the cylinder 70 and in the other direction by the admission of steam into the cylinder 72.

This steam admission is effected through tubes 82 and 83 connecting through elbows 84 and 85 with the cylinders 70 and 72 respectively. The arrangement of parts is such that when steam as a driving force is admitted to one of the tubes 82 and 83 the other tube acts as an exhaust. The mechanism by which this is attained is best shown in Figs. 4 through 8. At the top of the block 36 is a steam chest 90 to which the steam passes from the main steam chamber 14 through an inlet pipe 91 (Fig. 1) which opens near the upper wall 18 and has a downwardly extending bend or trap portion to inhibit entry of water to the steam chest. This means that the pressure within the steam chest 90 is sufficient to provide force to drive the pistons in their cylinders. An advantage of the present construction lies in the fact that all the valve parts, as well as the cylinders and associated mechanism, are in the steam generating chamber and hence are always all at the same temperature, eliminating condensation and the effects of expansion and contraction. The valve mechanism proper comprises a movable valve element or arm 92 seated on a valve seat or block 93 which forms the bottom of the steam chest 90. The valve arm 92 is slidable on the face of the block 93 and is swingable about an axis that is perpendicular to said face and is coincident with the axis of a shaft 94 (Figs. 1 and 2) which extends up through an opening provided in said block. A bushing 95 surrounds the shaft 94 and is provided at its lower end with a packing gland and a gland nut 96. The upper end of the bushing 95 projects up above the upper face of the valve seat 93 and provides a pivot post for the valve arm 92. The valve arm is thus freely swingable about this pivot and is in sliding contact with the upper face of the valve block 93. The pressure of the steam in the steam chest 90 tends to hold the valve arm 92 down against the valve block to provide a relatively tight seal between the valve arm and the block. The under side of the arm 92 is provided with a recess 100 which is shown approximately triangular in shape.

Figure 3:
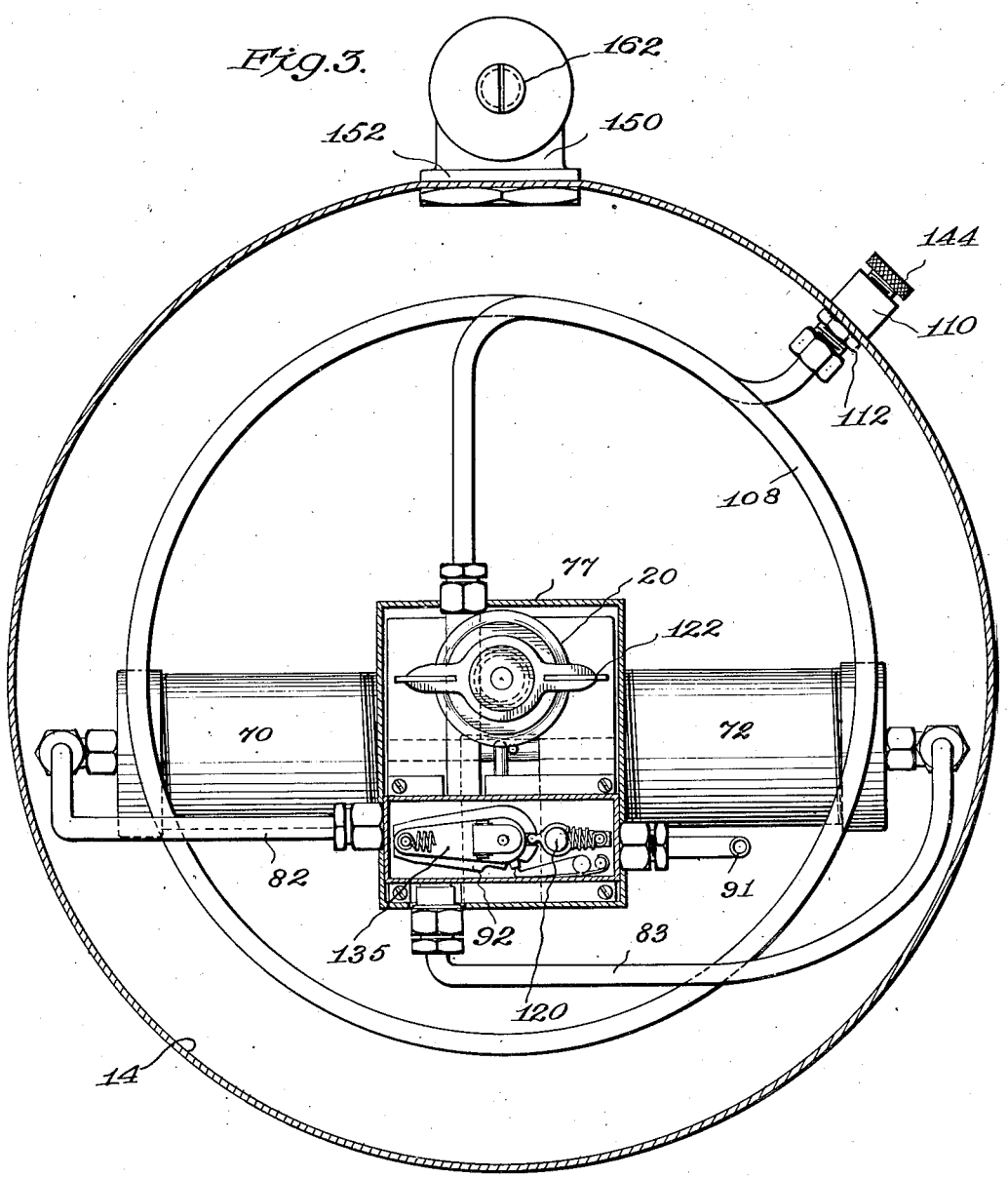
Fig. 3 is partially in plan and partially in horizontal section taken approximately on the line 3—3 in Fig. 1.

The admittance and exhausting of steam to and from the cylinders is through three holes formed in the block 93 forming the bottom of the steam chest and indicated respectively at 103, 104, 105. The opening 103 communicates with an exhaust tube 108 (Fig. 3) which is connected with a valve body 110 secured in the side wall of the vessel by a nut 112. The exhaust tube 108 is preferably coiled in the steam chamber 14 so that any condensation is evaporated and the exhaust steam is hence dry. The exhaust of steam is controlled by a valve element 114 in the valve body 110 and is discharged downwardly from the valve by a short tube 115.

The opening 104 is connected with the tube 82 communicating with the left hand cylinder, as shown in Fig. 1, while the opening 105 is connected with the tube 83 communicating with the right hand cylinder.

In all positions of the valve arm 92 the opening 103 lies within the aperture 100. However, as shown in Figs. 7 and 8, as the valve arm is swung from one side to the other, first the opening 104 is exposed to the steam chest, while the opening 105 opens within the aperture 100. In an opposite position of the arm 92 opening 105 is opened to the steam chest and opening 104 discharges into the aperture 100.

Assuming first the position of Fig. 7, the steam pressure within the steam chest causes steam to flow through the opening 104 and the tube 82 into the cylinder 70 to drive the piston 80 toward the right (Fig. 1). At the same time the opening 105 is in communication through the aperture 100 with the exhaust opening 103 and steam may be easily pushed out of the cylinder 72 to discharge the same through the opening 105 into the opening 103 and finally out of the system at 115.

It is desirable for the valve arm 92 to snap quickly from one position to the other to prevent the driving mechanism from stopping on dead center. The snap action of the valve is effected by the spring toggle mechanism shown in Figs. 1, 3 and 4. A toggle arm 120 is pivotally mounted on the upper face of the valve block 93 by means of a pivot post 121 fitting into a hole in the valve block. A finger 122 on the toggle arm 120 engages in a recess 123 in the valve arm 92 to provide a gear-like interconnection causing the two arms to swing in opposite directions about their respective picots. A coil spring 124 is connected between a pin or post 125 projecting upwardly from the free end portion of the valve arm 92 and a similar upstanding post 126 provided at the opposite end of the toggle arm 120. As the straight line distance between two posts 125 and 126 is greatest when the valve arm is in the central position shown in Fig. 4, the spring 124 will tend to hold the valve arm in the one or other of the positions shown in Figs. 7 and 8.

Acutation of the valve mechanism to snap the valve arm 92 from one position to the other is effected in timed relation with the reciprocation of the piston 80 and the connecting rack 65. The rack 65 carries a pair of spaced pins 130 and 131 adapted alternately to engage arm 132 (Fig. 2) which projects laterally from the shaft 94 that extends up through the valve block 93 and the valve arm 92. At its upper end the shaft 94 has an arm 133 carrying spaced fingers 134 engaging opposite sides of the coil spring 124. As the reciprocating pistons approach the end of the stroke in one direction, one of the pins, 130, 131, on the rack will engage the arm 132 to rock the shaft 94 about its axis. This will swing the arm 133 causing one of the fingers 134 to press against the spring 124, thereby displacing the central portion of the spring in a lateral direction. Upon lateral displacement of the spring beyond a critical point, the force vectors acting on the posts 125 and 125 swing to the opposite sides of the pivotal axes of the interconnected members 92 and 120 and cause them to swing about their pivots. It will be seen that when this action is initiated, the tension of the spring 124 acts on the valve arm 92 and toggle arm 120 to swing them quickly to the other extreme position, for example from the position of Fig. 7 to that of Fig. 8, with a snap action so that stalling of the valve in the central position shown in Fig. 4 is prevented.

To counteract any upward component of the pull of the spring 24 or post 125 which might tend to lift the outer end of the valve arm from its seat, a spring arm 135 (Figs. 1, 3 and 4) is provided to evert an opposing downward pressure. The leaf spring 135 is provided near one end with a hole fitting over the upper end of the bushing 95 (Fig. 1) and near the other end with a hole fitting over the upstanding port 125, so that the spring swings with the valve arm 92. The spring is held down against the valve arm by engagement with the under side of the arm 133 at the upper end of the rock shaft 94.

To further assure the snap action of the valve and hold the valve arm in the desired position until it is moved by a pin 130 or 131, a latch 140 is provided, as shown in Fig. 4. The latch is pivoted at 142 to the bottom of the steam chest and lies wholly within it. It is normally urged in a clockwise direction by a spring 143 bearing on a post 145. A tooth 146 on the latch is adapted to lie in one or the other of two notches 147 or 148 of the valve arm, depending upon whether it is in the position of Fig. 7 or the position of Fig. 8. The spring 143 is weak enough so that the latch tooth may be forced out of engagement with the valve arm notches when one of the pins 120 and 121 comes into play.

Water is supplied to the chamber 14 through an elbow 150 shown in Fig. 2. This elbow passes through an opening in the wall of the steam chamber and is held in place by a shoulder 152 and a nut 153. A removable cap 155 and a washer 156 normally close the mouth of the elbow.

A safety release pressure valve is carried in the cap. This consists of a ball 157 seating at 159 and normally held in that position by a calibrated coil spring 160. One end of the spring seats in a socket in a nut 162 threaded into the cap. As the pressure in the steam chamber builds up to exceed the pressure of spring 160 the ball rises and steam is vented out through an opening 164.

This valve is also useful to control the temperature at which cooking is done in the chamber 12. This cooling temperature, being dependent on heat transfer from the steam chamber 14, is a function of the steam pressure in that chamber—the temperature of the steam being proportional to its pressure. Thus, the setting of the nut 162 controls not only the pressure at which the ball 157 will open, but also the cooking temperature of the apparatus. In like manner by controlling the pressure in the steam chamber the rate at which the paddle blades 24 move may be varied. The rate of cooking and rate of stirring can likewise be controlled by the amount of heat applied to the vessel. The operation of the stirrer can also be regulated by the valve 114 (Fig. 1) controlling the steam exhaust. By closing this valve the stirring mechanism can be stopped, while the speed of operation can be varied by varying the amount the valve is opened. The apparatus is thus flexible in its operation, while at the same time being extremely simple to operate and regulate.

From the foregoing description it will be seen that I have provided an improved self-stirring and cooking vessel that incorporates many features heretofore unknown in the art. It will be understood that the embodiment illustrated in the drawing is shown only by way of example and that many changes in form may be made without departing from the scope of the invention, as defined by the following claims.

What I claim and desire to secure by Letters Patent is:

1. In a cooking utensil, the combination with a cooking vessel, of heating and stirring mechanism comprising a steam pressure generating chamber in heat transferring relation to but out of communication with said vessel, a stirring element in said vessel mounted for rotative movement about an axis, and steam operated driving mechanism for said stirring element positioned within said steam generating chamber including a piston and cylinder, and means to translate the reciprocating movement of said piston into rotary movement and drive said stirring element.

2. In a cooking utensil, the combination with a cooking vessel, of heating and stirring mechanism comprising a steam pressure generating chamber in heat transferring relation to but out of communication with said vessel, a stirring element in said vessel mounted for rotative movement about an axis, and steam operated driving mechanism for said stirring element positioned within said steam generating chamber including a dual piston and cylinder construction within said steam chamber, a rack operatively connected with said pistons, a pinion driven by said rack and a driving connection between said pinion and said stirring element.

3. In combination in a portable unit with a material holding vessel, heating and stirring mechanism comprising a steam pressure generating chamber in heat transferring relation to said vessel but separate therefrom, and a stirring element rotatably positioned in said receptacle, of opposed steam cylinders mounted inside said steam chamber, a piston head reciprocable in each of said cylinders, a rack extending between said piston heads, a pinion rotatably supported in engagement with said rack, means for transmitting power from said pinion to the stirring element through the bottom of said vessel, and valve means actuated by reciprocation of said piston heads and rack for controlling the flow of steam to said cylinders to produce reciprocation of said piston heads and rack to thereby drive the stirring element.

4. In combination in a portable unit with a material holding vessel, heating and stirring mechanism comprising a steam pressure generating chamber in heat transferring relation to said vessel but separate therefrom, and a stirring element rotatably positioned in said receptacle, of opposed steam cylinders mounted inside said steam chamber, a piston head reciprocable in each of said cylinders, a rack extending between said piston heads, two pinions rotatably supported in engagement with said rack, means for transmitting power alternatively from each pinion to the stirring element through the bottom of said vessel including a shaft, means for connecting one pinion to said shaft during travel of said rack in one direction, and the other pinion to said shaft during travel of the rack in the return direction.

5. In combination in a portable unit with a material holding vessel, heating and stirring mechanism comprising a steam pressure generating chamber in heat transferring relation to said receptacle but separate therefrom, and a stirring element rotatably positioned in said vessel, of steam operated driving means in said steam chamber for said stirring element comprising a steam cylinder and piston unit whose parts are reciprocable relative to one another, a valve element for controlling the flow of steam to said driving mechanism, said valve element being shiftable to one position to supply steam for producing relative movement of said piston and cylinder in one direction, and to another position for movement in the opposite direction, a rack reciprocated by admission of steam to said cylinder, two gears in engagement with said rack, a shaft to drive said stirring element, and means to connect one gear to drive said shaft when the rack moves in one direction and the other gear to drive said shaft when it moves in the opposite direction.

6. In combination with a cooking vessel, heating and stirring mechanism comprising a steam pressure generating chamber in heat transferring relation to said vessel but separate therefrom, and a stirring element pivotally mounted in said vessel, of opposed steam cylinders mounted within said steam chamber, a piston head reciprocable in each of said cylinders, a rack extending between said piston heads, a pinion rotatably supported in engagement with said rack, means for transmitting power from said pinion to the stirring element, shiftable valve means for controlling the flow of steam to said cylinders to produce reciprocation of said piston heads and rack, and means carried by said rack to shift said valve means at a predetermined point of travel of said rack.

7. In combination with a cooking vessel, heating and stirring mechanism comprising a steam pressure generating chamber in heat transferring relation to said vessel but separate therefrom, and a stirring element pivotally mounted in said vessel, of opposed steam cylinders mounted within said steam chamber, a piston head reciprocable in each of said cylinders, a rack extending between said piston heads, a pinion rotatably supported in engagement with said rack, means for transmitting power from said pinion to the stirring element, shiftable valve means for controlling the flow of steam to said cylinders to produce reciprocation of said piston heads and rack, and means to shift said valve means operatively connected with said pistons including an element carried by said rack to initiate movement of said valve means, and resilient means thereafter acting on said valve means to complete said shifting.

8. In combination with a cooking vessel, heating and stirring mechanism comprising a steam pressure generating chamber in heat transferring relation to said vessel, and a stirring element pivotally mounted in said vessel, of opposed steam cylinders mounted adjacent said vessel, a piston head reciprocable in each of said cylinders, a rack extending between said piston heads, two shafts one on each side of said rack and normal to its line of travel, a pinion rotatably supported on each shaft and in engagement with said rack, a one direction driving connection between each pinion and its shaft by which said shafts are driven in opposite directions by their pinions, a driving connection between one of said shafts and said stirring element, a second pinion on each shaft, an idler pinion connecting said second pinions, said gear assembly so acting that said stirring element is alternately driven by one and then the other of said first pinions.

9. In apparatus of the class described, the combination in a portable unit with a heating chamber, heating and stirring mechanism comprising a steam pressure generating chamber in heat transferring relation to but out of communication with said heating chamber and, a stirring element in said heating chamber, of steam operated driving mechanism for said stirring element positioned in said steam chamber, and a steam exhaust passage extending from said driving mechanism to the exterior of said steam chamber.

10. In apparatus of the class described, the combination in a portable unit with a heating chamber, heating and stirring mechanism comprising a steam pressure generating chamber in heat transferring relation to but out of communication with said heating chamber, a stirring element in said heating chamber, of steam operated driving mechanism for said stirring element positioned in said steam chamber, a steam exhaust passage extending from said driving mechanism to the exterior of said steam chamber, and means for controlling the operation of said driving mechanism by controlling the exhaust of steam through said passage.

11. In apparatus of the class described, the combination in a portable unit with a heating chamber, heating and stirring mechanism comprising a steam pressure generating chamber in heat transferring relation to but out of communication with said heating chamber, and a stirring element in said heating chamber, of steam operated driving mechanism for said stirring element positioned in said steam chamber, and snap acting valve mechanism for controlling the supply of steam from said steam chamber to said driving mechanism.

12. In apparatus of the class described, the combination in a portable unit with a heating chamber, heating and stirring mechanism comprising a steam pressure generating chamber in heat transferring relation to but out of communication with said heating chamber, and a stirring element in said heating chamber, of steam operated driving mechanism for said stirring element positioned in said steam chamber, and snap acting valve mechanism for controlling the supply of steam from said steam chamber to said driving mechanism, said valve mechanism comprising a movable valve element, resilient means for holding said valve element in one or another predetermined position, and means acting through said resilient means to shift said valve element from one position to another.

13. In apparatus of the class described, the combination in a portable unit with a heating chamber, heating and stirring mechanism comprising a steam pressure chamber in heat transferring relation to but out of communication with said heating chamber, and a stirring element in said heating chamber, of steam operated driving mechanism for said stirring element positioned in said steam chamber, and snap acting valve mechanism for controlling the supply of steam from said steam chamber to said driving mechanism, said valve mechanism comprising a pivoted valve element, a pivoted toggle element operably connected with said valve element, resilient means acting between said valve element and toggle element to hold said valve element in one or another predetermined position, and means acting through said resilient means to shift said valve element from one position to another.

PAUL E. MONATH.

REFERENCES CITED

The following references are of record in the file of this patent:

UNITED STATES PATENTS

| Number | Name | Date |
| --- | --- | --- |
| 469,305 | Rosenthal et al. | Feb. 23, 1892 |
| 555,451 | Jonsson | Feb. 25, 1896 |
| 1,067,336 | Hay | July 15, 1913 |
| 1,913,308 | Hueber et al. | June 6, 1933 |
| 2,371,807 | Dalzell et al. | Mar. 20, 1945 |